(12) United States Patent
Lin

(10) Patent No.: US 7,540,735 B1
(45) Date of Patent: Jun. 2, 2009

(54) EXTRUSION DIE DEVICE FOR A MOLDING MACHINE

(75) Inventor: Ping-Jung Lin, Yongkang (TW)

(73) Assignee: Jih Huang Machinery Industrial Co, Ltd., Yongkang, Tainan County (TW)

( * ) Notice: Subject to any disclaimer, the term of this patent is extended or adjusted under 35 U.S.C. 154(b) by 0 days.

(21) Appl. No.: 12/101,475

(22) Filed: Apr. 11, 2008

(51) Int. Cl.
*B29C 47/06* (2006.01)
*B29C 47/20* (2006.01)

(52) U.S. Cl. .................... 425/133.1; 425/381; 425/462; 425/466; 425/467

(58) Field of Classification Search ............ 425/133.1, 425/381, 462, 466, 467
See application file for complete search history.

(56) References Cited

U.S. PATENT DOCUMENTS

| | | | | |
|---|---|---|---|---|
| 4,297,092 A | * | 10/1981 | Goron | 425/133.1 |
| 4,302,170 A | * | 11/1981 | Goron | 425/133.1 |
| 4,548,569 A | * | 10/1985 | Pitigliano et al. | 425/133.1 |
| 5,116,215 A | * | 5/1992 | Hsu | 425/381 |
| 5,206,032 A | * | 4/1993 | Bock | 425/131.1 |

* cited by examiner

*Primary Examiner*—Robert B Davis
*Assistant Examiner*—Joseph Leyson
(74) *Attorney, Agent, or Firm*—Vedder Price P.C.

(57) ABSTRACT

An extrusion die device for a molding machine includes an accumulator which includes a housing, a core extending into the housing, and a main passage formed between the core and the housing and having interconnected upper and lower passage sections. The upper passage section has inner and outer annular passages spaced apart radially from each other. A die head has a die orifice and a die exit connected to a bottom end of the lower passage section. An extruding unit includes an annular plunger disposed movably within the housing, and dividing the upper passage section into the inner and outer passage sections. Two differently colored plastics can be extruded by the single annular plunger from the inner and outer passage sections through the die head.

2 Claims, 6 Drawing Sheets

EXTRUSION DIE DEVICE FOR A MOLDING MACHINE

BACKGROUND OF THE INVENTION

1. Field of the Invention

The invention relates to a molding machine, more particularly to an extrusion die device for a hollow molding machine.

2. Description of the Related Art

A hollow molding machine generally comprises a feeding device, an extrusion die device connected to the feeding device, and a molding device registered with the extrusion die device. In use, solid plastic is melted in the feeding device and fed into the extrusion die device. Afterward, the melted plastic is extruded from the extrusion die device into the molding device, and air is blown into the molding device to inflate the plastic into a desired hollow shape. Some hollow molding machines even have multiple feeding devices connected to one extrusion die device for feeding plastics with different colors into the extrusion die device such that a multicolor plastic can be extruded.

As shown in FIG. 1, a conventional extrusion die device 1 for a hollow molding machine comprises a base 11, three extruding units 12, and a control unit 13. The base 11 includes three concentric annular passages 111, three feed inlets 112 extending radially, outwardly, and respectively from the passages 111, and a die exit 113 that is in spatial communication with the bottom ends of the passages 111. Each of the feed inlets 112 fluidly communicates with a feeding device 10 of the molding machine. Each of the extruding units 12 includes an annular plunger 121 disposed movably in a respective one of the passages 111, and a hydraulic actuator 122 for driving upward and downward movements of the plunger 121. The control unit 13 includes a plug 131 extending movably through the plunger 121 of the innermost one of the extruding units 12. When the molding machine is in use, the plug 131 is driven to move upwardly such that a plug head formed at a distal end of the plug 131 closes the die exit 113. At that time, melted plastics are fed respectively by the feeding devices 10 into the passages 111 via the feed inlets 112, and are retained in the die exit 113. Afterward, the plug 131 is driven to move downwardly along with the plug head so as to open the die exit 113, and the plunger 121 of each of the extruding units 12 is driven immediately by the corresponding hydraulic actuator 122 to move downwardly, thereby extruding the melted plastics outwardly of the die exit 113 into a molding device (not shown) of the molding machine for subsequent processing.

In case the hydraulic actuators 122 are not actuated simultaneously, the slower one will have to overcome a larger pressure to drive movement of the corresponding plunger 121. Therefore, the extruding unit 12 further includes a servo motor (not shown) to ensure that the hydraulic actuators 122 will operate simultaneously. However, the installment of the servo motor results in a relatively complicated structure of the conventional extrusion die device and a relatively high manufacturing cost.

SUMMARY OF THE INVENTION

Therefore, the object of the present invention is to provide an extrusion die device that has a simpler structure and a lower manufacturing cost, and that can extrude plastics with different colors therefrom at the same time.

Accordingly, an extrusion die device of the present invention is adapted for use with a molding machine to extrude melted plastic and comprises a base, an accumulator, a die head, an extruding unit, and a plug unit. The base includes upper and lower mounting plates spaced apart from each other, and a plurality of mounting rods connected between the upper and lower mounting plates. The accumulator is connected to the lower mounting plate, and includes a housing that has a top wall and a surrounding wall extending downwardly from the top wall, a core that extends into the housing through the top wall and that has a stem hole extending therethrough, and a main passage that is formed between the core and the surrounding wall and that has interconnected upper and lower passage sections. The upper passage section has inner and outer annular passages spaced apart radially from each other. The accumulator further includes a first feed inlet that extends outwardly of the housing from a top end of the inner annular passage through the top wall, and a second feed inlet that extends through the surrounding wall and that fluidly communicates with a top end of the outer annular passage. The die head includes a die orifice that is connected to a bottom end of the lower passage section, and a die exit that is formed at a bottom end of the die orifice. The extruding unit includes a movable plate that slides along the mounting rods between the upper and lower mounting plates, at least one power drive that is disposed for driving the movable plate, an annular plunger that is disposed movably within the housing and that divides the upper passage section into the inner and outer annular passages, and a plurality of connecting rods that extend into the housing from the movable plate through the top wall and that are connected to the annular plunger for moving the annular plunger between the upper and lower passage sections. The plug unit includes a stem holder that is mounted on the base, a plug stem that extends movably into the stem hole from the stem holder through the lower mounting plate and the movable plate, a plug head that is disposed in the die orifice to close or open the die exit, and an air hole that extends through the plug stem and the plug head. The plug head has a diameter smaller than that of the die orifice and larger than that of the die exit. The stem holder is operable to move the plug head toward or away from the die exit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
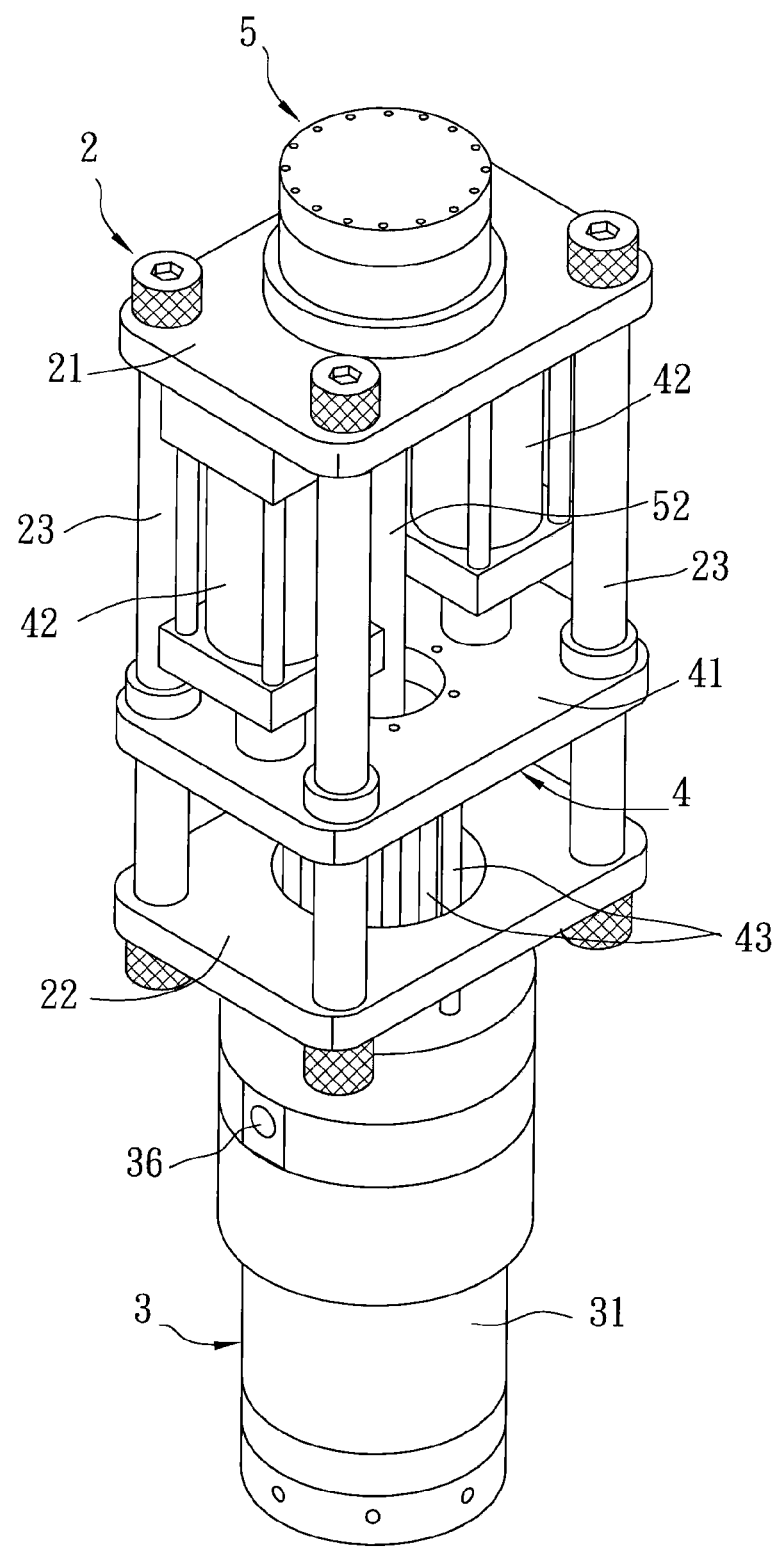
FIG. 2 is a perspective view of a preferred embodiment of an extrusion die device according to the invention.
Figure 3:
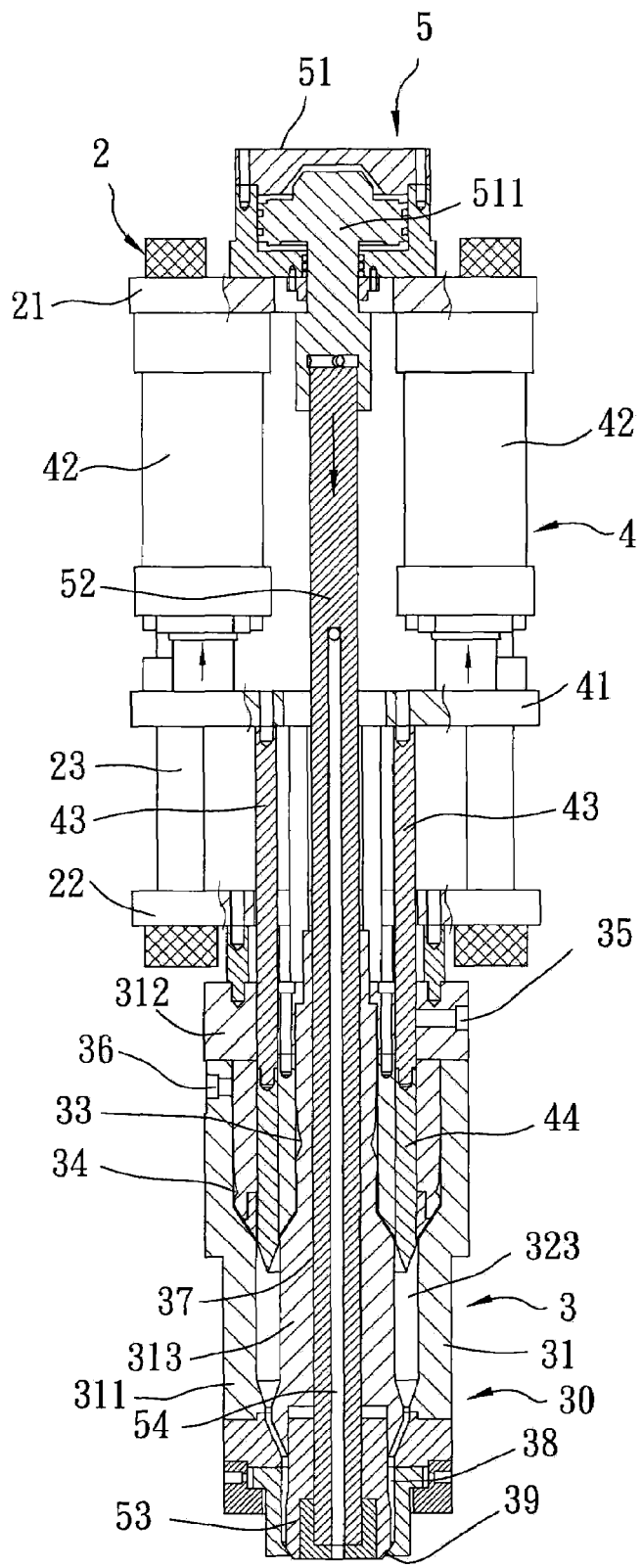
FIG. 3 is a partly sectional view of the preferred embodiment, illustrating a plug unit with a plug head closing a die exit.
Figure 4:
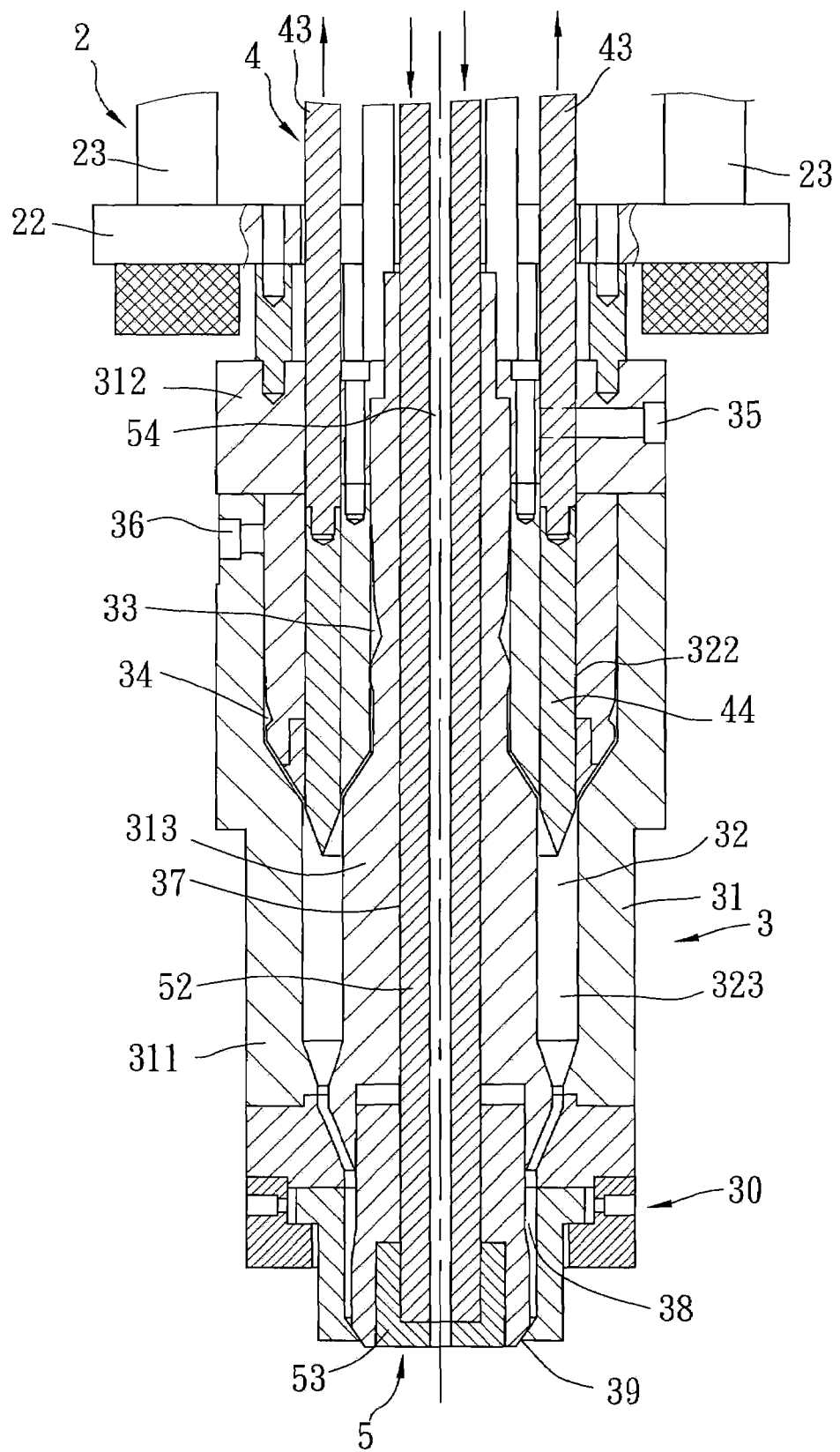
FIG. 4 is an enlarged fragmentary sectional view of the preferred embodiment, illustrating the plug unit with the plug head closing the die exit.

As shown in FIGS. 2 to 4, the preferred embodiment of an extrusion die device according to the present invention is adapted for use with a hollow molding machine (not shown)

and comprises a base 2, an accumulator 3, a die head 30, an extruding unit 4, and a plug unit 5.

The base 2 includes parallel upper and lower mounting plates 21, 22, and four spaced apart mounting rods 23 that are connected between the upper and lower mounting plates 21, 22.

The accumulator 3 is connected securely to the bottom side of the lower mounting plate 22, and includes a housing 31, a core 313, a main passage 32, a first feed inlet 35, and a second feed inlet 36. The housing 31 has a top wall 312 and a surrounding wall 311 extending downwardly from the top wall 312. The core 313 extends into the housing 31 through the top wall 312 and has a stem hole 37 extending therethrough. The main passage 32 is formed annularly between the core 313 and the surrounding wall 311 of the housing 31, and has interconnected upper and lower passage sections 322, 323. The upper passage section 322 has inner and outer annular passages 33, 34 that are spaced apart radially from each other. The first feed inlet 35 extends outwardly of the housing 31 from a top end of the inner annular passage 33 through the top wall 312, and is adapted for fluidly communicating with a feeding device (not shown) of the molding machine. The second feed inlet 36 extends through the surrounding wall 311, and has one end fluidly communicating with a top end of the outer annular passage 34 and an opposite end adapted for fluidly communicating with another feeding device (not shown) of the molding machine.

The die head 30 includes a die orifice 38 that is connected to a bottom end of the lower passage section 323 of the main passage 32 in the accumulator 3, and a die exit 39 that is formed at a bottom end of the die orifice 38.

In this embodiment, the extruding unit 4 includes a movable plate 41, a pair of power drives 42, an annular plunger 44, and four connecting rods 43. The movable plate 41 is disposed parallel to the upper and lower mounting plates 21, 22 of the base 2, and slides along the mounting rods 23 of the base 2 between the upper and lower mounting plates 21, 22. Each of the power drives 42 is a hydraulic actuator in this embodiment, and is connected to the bottom side of the upper mounting plate 21 for driving movement of the movable plate 41. The annular plunger 44 is disposed movably within the housing 31 of the accumulator 3, and divides the upper passage section 322 of the main passage 32 in the accumulator 3 into the inner and outer annular passages 33, 34. The connecting rods 43 extend into the housing 31 from the movable plate 41 through the top wall 312, and are connected to the annular plunger 44 for moving the annular plunger 44 between the upper and lower passage sections 322, 323. Therefore, the power drives 42 can be actuated to drive movement of the movable plate 41, thereby moving the annular plunger 44 upwardly and downwardly in the main passage 32 via the connecting rods 43. It should be noted that the number of the power drives 42 and the type of each of the power drives 42 may vary according to this invention.

The plug unit 5 includes a stem holder 51 that is mounted on the upper mounting plate 21 of the base 2, a plug stem 52 that is held by the stem holder 51 and that extends movably into the stem hole 37 in the core 313 of the accumulator 3 from the stem holder 51 through the lower mounting plate 22 of the base 2 and the movable plate 41 of the extruding unit 4, a plug head 53 that is formed at the bottom end of the plug stem 52 and that is disposed in the die orifice 38 in the die head 30 to close or open the die exit 39 in the die head 30, and an air hole 54 that extends through the plug stem 52 and the plug head 53. The plug head 53 has a diameter smaller than that of the die orifice 38 and larger than that of the die exit 39. In this embodiment, the stem holder 51 has a hydraulically actuated plunger 511 connected to the plug stem 52. The plunger 511 is hydraulically operated to drive movement of the plug stem 52 so as to move the plug head 53 toward or away from the die exit 39.

Figure 5:
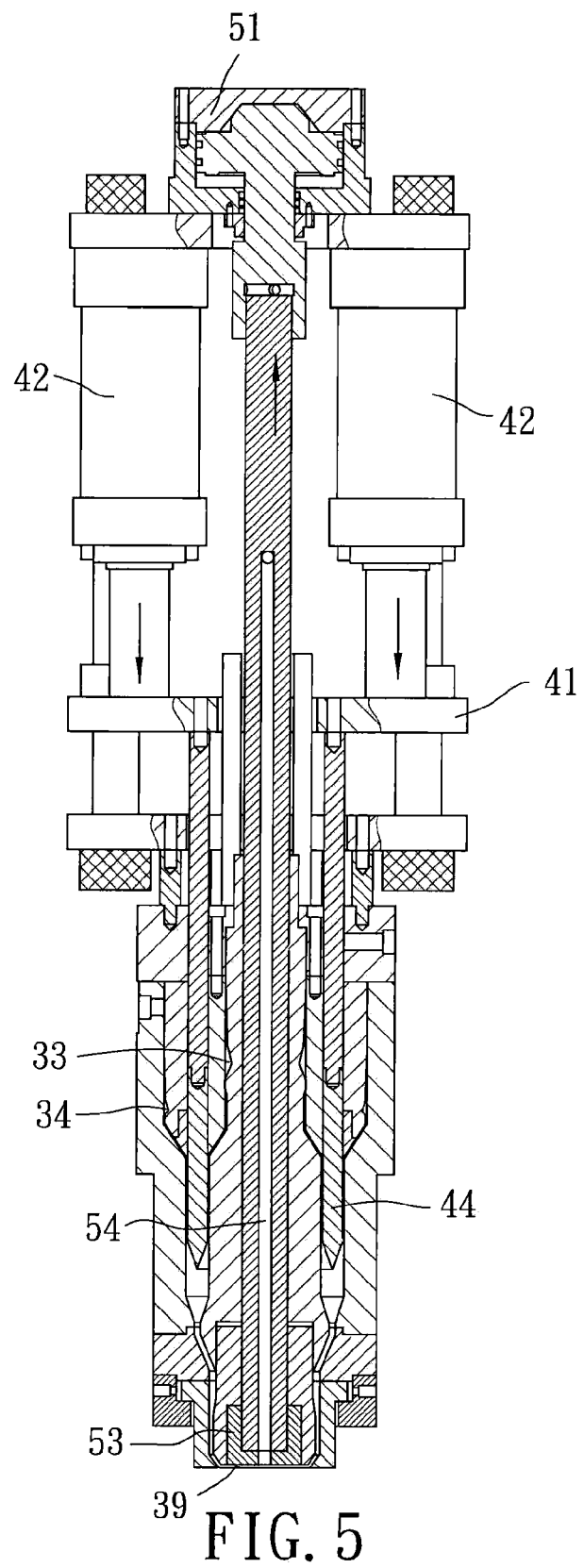
FIG. 5 is a view similar to FIG. 3, but illustrating the plug unit with the plug head away from the die exit.
Figure 6:
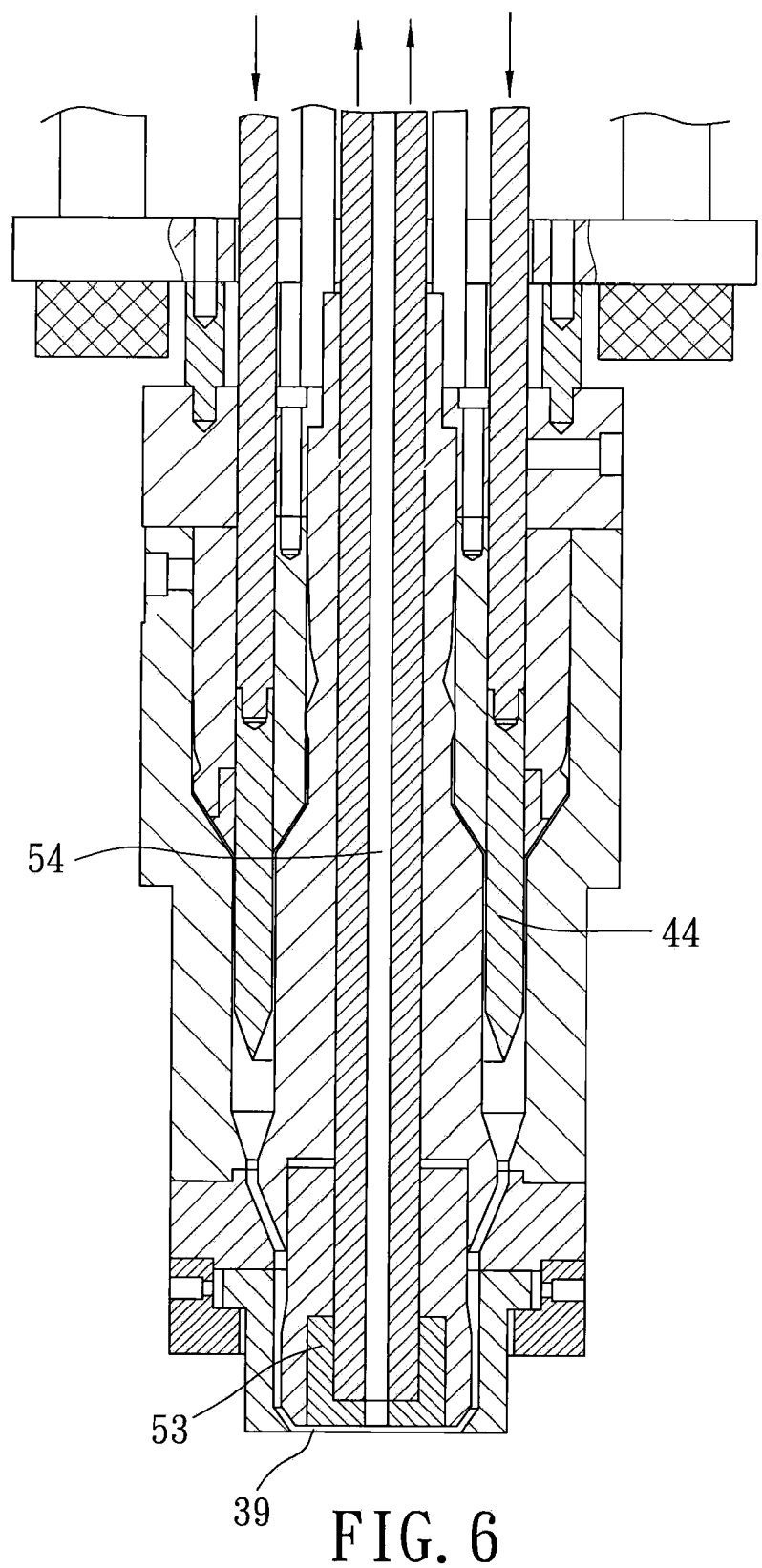
FIG. 6 is a view similar to FIG. 4, but illustrating the plug unit with the plug head away from the die exit.

As shown in FIGS. 3 and 4, in use, the stem holder 51 of the plug unit 5 is actuated to drive the plug head 53 to move downwardly, thereby closing the die exit 39 in the die head 30. Afterward, a melted molding material is fed into the inner and outer annular passages 33, 34 in the upper passage section 322 of the main passage 32 via the first and second feed inlets 35, 36 by the feeding device of the molding machine, and is consequently accumulated in the lower passage section 323 of the main passage 32 and the die orifice 38 in the die head 30. At that time, referring to FIGS. 5 and 6, the stem holder 51 is actuated once again to drive the plug head 53 to move upwardly, thereby opening the die exit 39 in the die head 30. Afterward, the power drives 42 of the extruding unit 4 are actuated to drive downward movement of the movable plate 41 along with the annular plunger 44, thereby extruding the melted molding material into the molding device of the molding machine via the die exit 39. Air is then blown into the molding device to inflate the melted molding material to fit the interior shape of the molding device. After the molding material has cooled and formed into a hollow product, the molding device is opened and air is blown into the molding device through the air hole 54 in the plug unit 5 to eject the product.

The molding material may include one or more melted plastics. When a dual-colored product is to be produced, two melted plastics may be fed through two feeding devices into the first and second feed inlets 35, 36 in the accumulator 3. In this case, the annular plunger 44 of the extruding unit 4 is in contact with the two plastics and can extrude the two plastics at the same time. When a single-colored product is produced, a melted plastic may be fed through one feeding device into one of the first and second inlets 35, 36.

Figure 1:
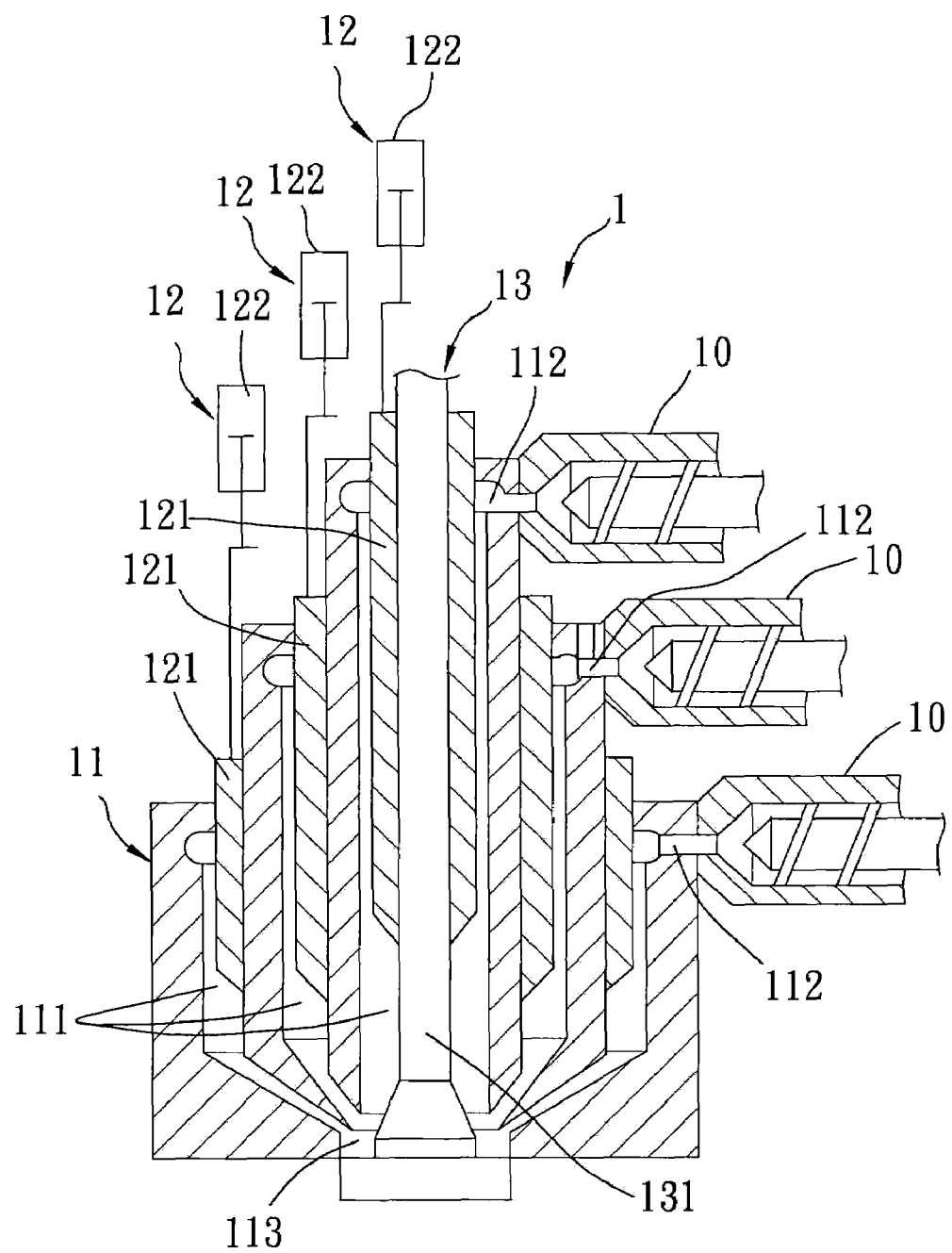
FIG. 1 is a partly sectional schematic view of a conventional extrusion die device.

Since two differently colored melted plastics fed into the inner and outer annular passages 33, 34 can be co-extruded by the single annular plunger 44, the servo motor which is required conventionally to synchronize the multiple hydraulic actuators 122 as used in the prior art (see FIG. 1) can be eliminated. Therefore, the extrusion die device of the invention has a simpler structure and a lower manufacturing cost than the prior art, and can extrude easily and smoothly the plastics therefrom.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An extrusion die device for a molding machine comprising:
a base including upper and lower mounting plates that are spaced apart from each other, and a plurality of mounting rods that are connected between said upper and lower mounting plates;
an accumulator connected to said lower mounting plate, and including
a housing that has a top wall and a surrounding wall extending downwardly from said top wall,
a core that extends into said housing through said top wall, and that has a stem hole extending therethrough,
a main passage that is formed between said core and said surrounding wall and that has interconnected upper and lower passage sections, said upper passage section having inner and outer annular passages that are spaced apart radially from each other, a first feed inlet that extends outwardly of said housing from a top end of said inner annular passage through said top wall, and a second feed inlet that extends through said surrounding wall and that fluidly communicates with a top end of said outer annular passage;

a die head including a die orifice that is connected to a bottom end of said lower passage section, and a die exit that is formed at a bottom end of said die orifice;

an extruding unit including a movable plate that slides along said mounting rods between said upper and lower mounting plates, at least one power drive that is disposed for driving said movable plate, an annular plunger that is disposed movably within said housing and that divides said upper passage section into said inner and outer annular passages, and a plurality of connecting rods that extend into said housing from said movable plate through said top wall and that are connected to said annular plunger for moving said annular plunger between said upper and lower passage sections; and a plug unit including a stem holder that is mounted on said base, a plug stem that extends movably into said stem hole from said stem holder through said lower mounting plate and said movable plate, a plug head that is disposed in said die orifice to close or open said die exit, and an air hole that extends through said plug stem and said plug head, said plug head having a diameter smaller than that of said die orifice and larger than that of said die exit, said stem holder being operable to move said plug head toward or away from said die exit.

2. The extrusion die device as claimed in claim 1, wherein extruding unit includes a pair of said power drives.

* * * * *